Oct. 25, 1949.  G. A. CUNNINGTON  2,486,125
SPACING MEANS FOR CARGO UNITS
Filed June 24, 1947
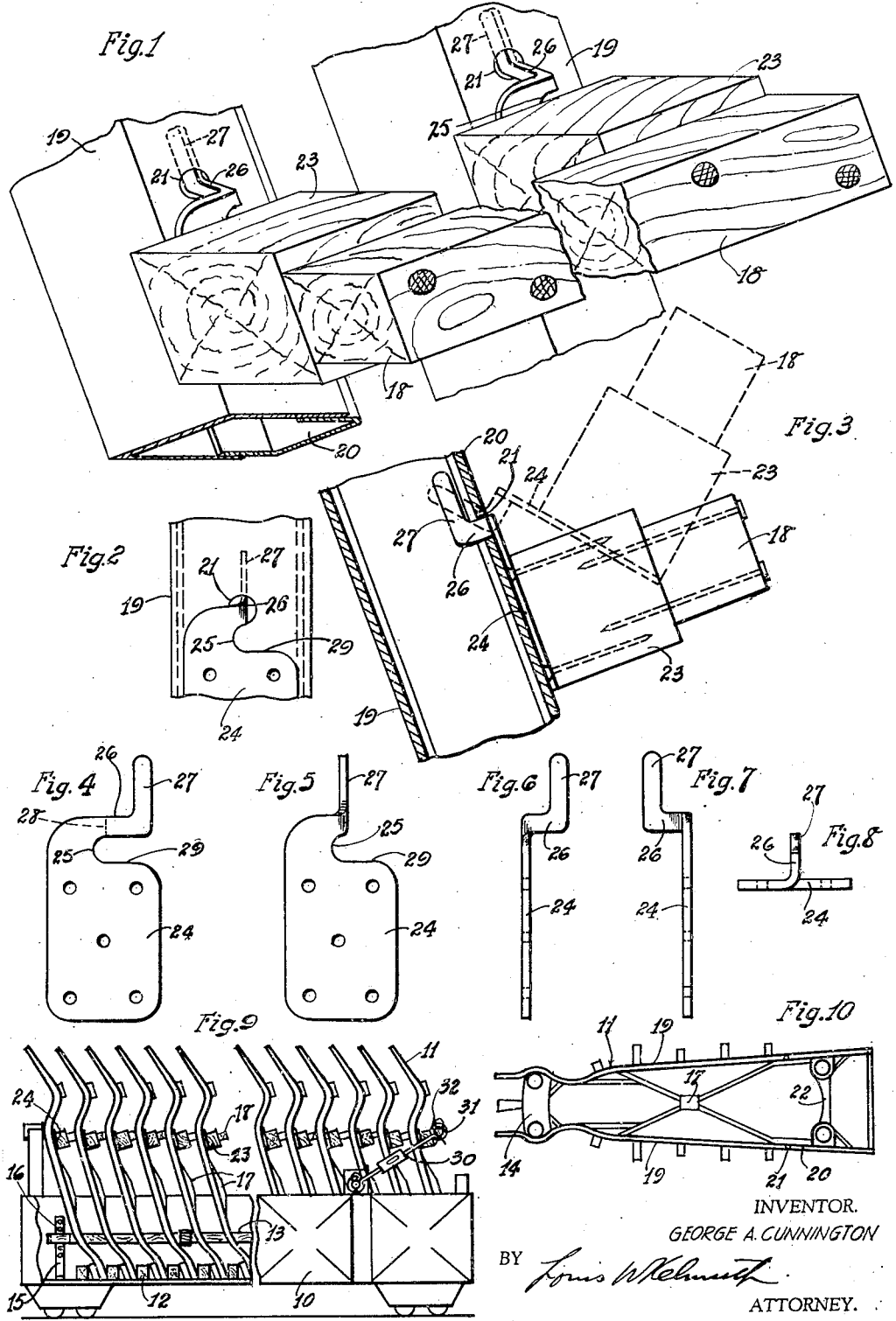
INVENTOR.
GEORGE A. CUNNINGTON
BY
ATTORNEY.

Patented Oct. 25, 1949

2,486,125

UNITED STATES PATENT OFFICE 2,486,125

SPACING MEANS FOR CARGO UNITS

George A. Cunnington, Avon, Ohio, assignor to The Midland Steel Products Company, Cleveland, Ohio, a corporation of Ohio Application June 24, 1947, Serial No. 756,601

5 Claims. (Cl. 105—367)

This invention relates to new and useful improvements in material handling or transporting means and an important object of the invention is to provide simple, quick and efficient means forming a quick attachable and detachable connection between two or more parts in a system of transportation or in an assembly line where speed is the essence of the operation.

Another object is to provide means for preventing damage to shiftable freight or cargo, and more particularly to the prevention of damage caused by shifting movement of the cargo or between individual pieces of the freight or cargo in transit.

An important object of the invention is to provide simple and inexpensive means which can be rapidly and accurately attached to and detached from the pieces of freight or other objects to form a detachable support, as for example, a support for a spacer bar between pieces of freight to prevent its accidental displacement in all directions.

Another object of the invention is to provide a device of this character which is easily and effectively interlocked in an operative position and which must be manipulated to unlock or disengage the same when its use is no longer required.

Other objects and advantages of the invention will become apparent during the course of the following description.

In the accompanying drawing forming a part of the description and wherein like numerals are employed to designate like parts throughout the several views, Fig. 1 is a perspective view of the spacer bar shown attached to the side rails of an automobile frame, Fig. 2 is a side elevation of part of a side rail to which the spacer bar is attached showing the interlocking means between the spacer bar and said rail, Fig. 3 is a section through said side rail showing in full lines the interlocking means locked to the rail; and in dotted lines, the position of the interlocking means being detached from the rail, Fig. 4 is a plan view of a metal blank prior to bending the interlocking tongue.

Fig. 5 is a plan view of said blank after bending;

Fig. 6 is a side elevation of the blank showing one longitudinal edge thereof,

Fig. 7 is a similar view of the blank showing the opposite longitudinal edge thereof, Fig. 8 is an end elevation of the finished blank, Fig. 9 is more or less diagrammatic illustration of a gondola freight car loaded with automobile frames to which the present invention is applied, Fig. 10 is a diagrammatic top plan of an automobile frame.

While there are numerous forms of the invention and uses thereof, its preferred bodiment and use are illustrated herewith, Figs. 1 to 10 in connection with the shipping of automobile frames 11 in open gondola freight cars 10. These frames are usually shipped substantially upright in two rows of approximately forty each lengthwise of each gondola car, and are inclined toward one end of the car as illustrated in Figure 9. Each frame 11 as shown in Figs. 9 and 10 stands on its end (which is its front end when in use in an automobile) in the bottom of the car tilted and resting upon the next adjacent frame supported in the same way; the end frame in the row being slightly tilted and resting against the end rack in the car as illustrated. Transverse wooden spacer bars 12 are secured to boards on the floor of the car on which the frames rest, between adjacent frames to maintain the lower ends of the frames spaced apart, and these ends are held down against vertical movement on the bottom of the car by a longitudinal timber or bar 13. This longitudinal bar is composed of a series of sections detachably spliced together to form one continuous bar resting upon the front cross members 14 of the stacked frames. Both ends of each longitudinal bar are slotted for the projection therethrough of the slotted latches 15 so that wedges or pins 16 may be entered through the appropriate slots in the latches to bear against the tops of the longitudinal bars and retain them against vertical displacement and thereby prevent corresponding movement of the frames in the stack or row.

When the car is fully loaded, there is considerable and varying weight imposed upon the various frames by their inclined relation, which when set into motion by the travel, flexing, starting, stopping, coupling and switching of the cars in transit, impose considerable stress upon these frames, sometimes causing them to separate, or shift as a unit with consequent impact, misalignment and damage to the frames or parts thereof upon their return to or toward normal original position. Some designs of frames involve parts which project beyond the general plane or planes thereof, such as cross members 14 or X-members 17, which due to their projection receive the stress or impact damage from adjacent shifting or moving frames. In order to maintain proper spacing between adjacent frames to hold them clear of one another and to prevent such damage, it has been customary to place horizontal wooden spacer bars transversely between each pair of frames adjacent to their upper ends. These, however, become accidentally dislocated or fall from between the frames in transit, thereby permitting looseness of the cargo pack and movement of the frames relatively to cause the aforesaid damage. Various ways and means have been tried in efforts to prevent this accidental looseness and shifting of the cargo and the dislocation of these spacer bars with consequent damage, but these schemes have been either too expensive, slow or insufficient. The present invention provides an inexpensive, quick and efficient means for interlocking wooden spacer bars 18 with the frames, and also efficient means for preventing individual movement of the frames or of the stack or cargo as a unit.

Referring more particularly to Figs. 3 and 4 of the drawing, the two side rails 19 of an automobile frame are of closed box cross section in certain portions 20 precluding ready access to their interiors, and the top of each rail forwardly of it rear kickup or offset portion has a circular opening 21 therein, either as a locating or attachment hole which is utilized in fastening the spacer bars thereto. The size and position of these holes vary, as between frames for different makes and models of automobiles, and sometimes as between the two rails of a single frame, from one-half inch to $^{21}/_{32}$ of an inch in diameter. If no such holes are provided in the frame in the particular location desired for the spacers, suitable holes may be provided during the manufacture of the frames.

These frames, three at a time, with their kickups nested and with the X-members 17 projecting from the same corresponding tops of the frames, are delivered to the gondola car by an overhead crane with a sling looped under the rear cross members 22 so that they may be lowered to rest on the floor of the car 10, front ends of the frames first. As the frames are stacked one by one, after release from the sling, inclined and substantially upright in the car, the spacer blocks 12 may be mailed to the floor as shown, between each pair of frames or at regular intervals throughout the stack as the pitch of the stacked frames requires. Also a horizontal spacer bar 18 is attached to each frame as shown to be disposed between each pair of frames as they are stacked one by one in inclined relation, with one frame resting against the spacer bar of the preceding frame which has been loaded into the car. Each spacer bar is composed of a pair of 3 x 7 inch wooden end blocks 23 nailed to the ends of the 2 x 2 inch wooden bar 18 of approximately 48 inch in length to bridge the space between the side rails 19 of a frame.

To the face of each block opposite the face to which the bar 18 is nailed, is secured a stamping of $\frac{1}{8}$ inch thick steel stock having a substantially rectangular body portion 24, $3\frac{1}{2}$ x $2\frac{1}{4}$ inches provided with five holes by which it can be nailed or otherwise secured to each block 23. One longitudinal edge of the blank is provided with a relatively deep narrow notch 25 which together with the end edge of the blank provides a short arm 26 of an L-shaped tongue or projection, the long arm 27 of which extends lengthwise of and in the same plane as the body as shown in Fig. 4 prior to the bending of the L-shaped tongue at substantially right angles to the plane of the body, as shown in finished form in Fig. 6. The L-shaped hook or tongue is approximately $\frac{7}{8}$ of an inch in width and its short arm in approximately $\frac{5}{8}$ inch long while its long arms is $1\frac{5}{8}$ inches long. By bending the short arm of the tongue at a point 28 shown in Fig. 4, half-way the width of the blank and at right angles to the body thereof, this L-shaped tongue is disposed in a plane at right angle to the plane of the body and at the longitudinal center thereof as shown in Figs. 1, 2, 3, and 5 to 8, so that no rights and lefts are required for the stampings at the two ends of the spacer bar. In nailing the stamping to each block 23 as shown, the longitudinal edge 29 of the notch forms a guide by which it can be secured coincident with the longitudinal edge of the block with the L-shaped tongue above the top of the block and in a plane perpendicular thereto and extending outwardly and laterally of the face of the block to which the stamping is fastened.

With the stampings fastened to the spacer bar as shown in Fig. 1, the bar is simply lifted to bridge the space between the automobile side rails 11 with the long arms 27 of the L-shaped tongues pointing into the openings 21 in the side rails, and is moved to enter these arms to these openings until the short arms 26 strike the auto rails. The spacer bar 18 is then released and by its own weight will swing down with the short arms of the L-shaped tongues resting upon the edges of the openings 21 with the spacer blocks 23 resting against the side rails of the frame and dispose the long arms 27 behind the edges of the openings 21 to lock the tongues therein and the space bar 18 against accidental displacement in all directions. Thus, it will be apparent that with the weight of one frame leaning against the next adjacent spacer bar and so on throughout the stack, upward swinging movement of the individual spacer bars 18 to the dotted line position shown in Fig. 3, or to an extent permitting accidental displacement of the bars will be precluded even though the frames should separate in transit, since the long arms 27 of the tongue are locked behind the edges of the openings 21.

After the two rows of stacked frames have been loaded into the car, the longitudinal hold down bars 13 are assembled and latched into position bearing upon the front cross members 14 of each row of frames to prevent their vertical displacement. If desired, the two rows of frames in the car may be further held in their illustrated tilted stacked positions by a U-shaped yoke 30 hinged to the sides of the gondola car and encircling the end frames of the two stacked rows, it being understood that each arm of the U-shaped yoke is provided with a loop 31 through which is passed a transverse bar 32 held against endwise movement by the cotter pins as shown. A turnbuckle is included in each arm of the yoke to tightly clamp the bar 32 of the yoke against the two rows of frames to firmly hold them as a unit in the car.

When the car reaches its unloading destination, bar 32 of the U-shaped yoke is removed permitting the arms of the yoke to drop down and the frames to be tilted to an upright position one by one after the longitudinal hold down bars 13 are unlatched and removed. As each frame is tilted to an upright position, its respective spacer bar 18 is swung upwardly to approximately 90° shown in dotted line position shown in Fig. 3, so as to align the long arms 27 of the L-shaped tongues with their respective openings 21 whereby the tongues 27 can be slipped out of these openings at this angle to rapidly detach the spacer bar therefrom, after which the spacer bars are thrown into the bottom of the car for re-use.

It will be understood that various changes in the shape size, and relation of parts may be resorted to without departing from the spirit of the invention or the scope of the appended claims.

I claim:

1. The combination with a vehicle, of a cargo comprising a plurality of automobile frames with openings in the tops of their side rails and stacked upright therein on corresponding ends, a spacer member arranged horizontally between each pair of frames, and a pair of L-shaped hooks connected to each end of each spacer member adapted to be hooked into the opening, in said frame to support said spacer between each pair of frames against a movement in all directions irrespective of shifting of the cargo in transit.

2. The combination with a plurality of automobile frames stacked on end and having openings in the tops of their side rails, of horizontal spacers between each pair of said frames adjacent to said openings, and separate anchors for each of said openings having portions insertable in said openings, two of said anchors being connected to each of said spacers for securing it to its frame.

3. The combination with a plurality of automobile frames stacked on end and having openings in the tops of their side rails, of horizontal spacers between each pair of said frames adjacent to said openings, and separate anchors for each of said openings having L-shaped portions at their upper ends insertable in said openings, two of said anchors being connected below the said L-shaped portions to each of said spacers for securing it to its frame.

4. A spacer, for use between automobile frames stacked on end and having openings in the tops of their side rails, comprising a bar substantially as long as the width of such a frame, and anchors operatively connected to said bar and having L-shaped projections to extend into said openings.

5. A spacer, for use between automobile frames stacked on end and having openings in the tops of their side rails comprising a bar substantially as long as the width of such a frame, blocks attached to said bar near its ends to bear against said side rails and anchors attached to said blocks and having L-shaped projections at their upper ends for insertion into said openings with the resultant attachment of the bar and blocks to said frame.

GEORGE A. CUNNINGTON.

REFERENCES CITED

The following references are of record in the file of this patent:

UNITED STATES PATENTS

| Number | Name | Date |
| --- | --- | --- |
| 1,504,522 | Sherer | Aug. 12, 1924 |
| 1,808,873 | Weeks | June 9, 1931 |
| 2,137,911 | Innocenti | Nov. 22, 1938 |
| 2,208,237 | Williams et al. | July 16, 1940 |

Certificate of Correction

Patent No. 2,486,125                                                       October 25, 1949

GEORGE A. CUNNINGTON

It is hereby certified that errors appear in the printed specification of the above numbered patent requiring correction as follows:

Column 3, line 47, for the word "mailed" read *nailed*; column 4, line 2, for "in", second occurrence, read *is*; line 3, for "arms" read *arm*; line 35, for "space" read *spacer*; column 5, line 16, for "opening" read *openings*;

and that the said Letters Patent should be read with these corrections therein that the same may conform to the record of the case in the Patent Office.

Signed and sealed this 7th day of March, A. D. 1950.

[SEAL]

THOMAS F. MURPHY,
                                                                               *Assistant Commissioner of Patents.*